(12) United States Patent
Choi et al.

(10) Patent No.: US 7,537,714 B2
(45) Date of Patent: May 26, 2009

(54) YTTRIUM BASED PHOSPHORS COMPRISING CONDUCTING MATERIAL, PROCESS FOR PREPARING THE YTTRIUM BASED PHOSPHORS AND DISPLAY DEVICE USING THE YTTRIUM BASED PHOSPHORS

(75) Inventors: Sung-Ho Choi, Suwon-si (KR); Sang-Hyuk Lee, Suwon-si (KR); Yong-Chan You, Suwon-si (KR); Sang-Hoon Shin, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 385 days.

(21) Appl. No.: 11/314,501

(22) Filed: Dec. 22, 2005

(65) Prior Publication Data

US 2006/0151753 A1     Jul. 13, 2006

(30) Foreign Application Priority Data

Dec. 24, 2004   (KR)   .................. 10-2004-0112164

(51) Int. Cl.
*H01B 1/08* (2006.01)
(52) U.S. Cl. .................. 252/520.5; 252/520.1; 349/69
(58) Field of Classification Search ............ 252/515, 252/518.1, 520.1, 520.5, 301.14 R, 301.5 R; 349/69, 70
See application file for complete search history.

(56) References Cited

U.S. PATENT DOCUMENTS

| | | | | |
|---|---|---|---|---|
| 6,939,482 | B2 * | 9/2005 | Miura et al. | 252/301.4 S |
| 2001/0008363 | A1 * | 7/2001 | Sanghera et al. | 313/496 |
| 2001/0013592 | A1 | 8/2001 | Gwak et al. | |

FOREIGN PATENT DOCUMENTS

| | | |
|---|---|---|
| GB | 1198965 | 3/1969 |
| JP | 48-30834 | 9/1973 |
| JP | 54-18484 | 2/1979 |
| JP | 57-23676 | 2/1982 |
| JP | 57-44695 | 3/1982 |
| JP | 57-212286 | 12/1982 |
| JP | 3-24188 | 2/1991 |
| JP | 3-269085 | 11/1991 |
| JP | 5-70775 | 3/1993 |
| JP | 07-310074 | * 11/1995 |
| JP | 8-41454 | 2/1996 |
| JP | 11-172240 | 6/1999 |
| JP | 2002-138279 | 5/2002 |
| JP | 2005-75863 | 3/2005 |

(Continued)

OTHER PUBLICATIONS

Sun et al "Luminescent properties of Li+ doped nanosized Y2O3:Eu", Solid State Comm 119 (2001) 393-396.*

(Continued)

*Primary Examiner*—Mark Kopec
(74) *Attorney, Agent, or Firm*—Stein McEwen, LLP

(57) ABSTRACT

An yttrium based phosphor, a process for preparing the yttrium based phosphor, and a display device using the yttrium based phosphor, the yttrium based phosphor including a conducting material such as $WO_3$ or $SnO_2$, and exhibiting an enhanced luminance characteristic under low voltage, and high current density conditions.

12 Claims, 1 Drawing Sheet

FOREIGN PATENT DOCUMENTS

JP   2005-298817    10/2005
KR   2001-0026774    4/2001

OTHER PUBLICATIONS

Borchardt et al "Yttrium-Tungsten Oxides" Inorganic Chemistry, vol. 2, No. 1, Feb. 1963 pp. 170-173.*

Hayashi et al "Phase relationships and their effect on cathodeoluminescence in the yttrium oxide-tungsten oxide system", Jour Mat Science, 16 (1981) pp. 3229-3233.*

Office Action issued by the Japanese Patent Office on May 1, 2008, No English translation.

Korean Office Action dated Jun. 29, 2006 in corresponding Korean Patent Application No. 2004-0112164.

Office Action issued in Korean Application No. 2004-112164 on Dec. 11, 2006, No English lang translation.

Tsuyoshi Kano et al., "A Red OF High Lumen Equivalent," Oct. 1982, vol. 129. No. 10, pp. 2296-2298.

* cited by examiner

YTTRIUM BASED PHOSPHORS COMPRISING CONDUCTING MATERIAL, PROCESS FOR PREPARING THE YTTRIUM BASED PHOSPHORS AND DISPLAY DEVICE USING THE YTTRIUM BASED PHOSPHORS

CROSS-REFERENCE TO RELATED APPLICATION

This application claims the benefit of Korean Patent Application No. 2004-112164, filed on Dec. 24, 2005, in the Korean Intellectual Property Office, the disclosure of which is incorporated herein by reference.

BACKGROUND OF THE INVENTION

1. Field of the Invention

An aspect of the present invention relates to an yttrium based phosphor having an enhanced luminance characteristic, a process for preparing the yttrium based phosphor, and a display device using the preparation process of the yttrium based phosphor. More particularly, an aspect of the present invention relates to an yttrium based phosphor including a conducting material and exhibiting an enhanced luminance characteristic under low voltage, and high current density conditions.

2. Description of the Related Art

Known methods of enhancing the efficiency of cathodoluminescent (CL) phosphors that emit light by electron emission include adding a co-activator, coating a surface modifier, particularly using nanoparticles, and so on. An example is given in Korean Published Patent Application No. 2001-57915, which describes a surface coating using $(Sn_{1-x}Eu_x)O_2$ oxide or a solid phase reaction. According to the described method, $SnO_2$:Eu is a phosphor which, when excited at low voltages, produces an orange-red color (having a peak emission of approximately 595 nm) and has conductivity in itself. However, the conventional techniques require additional operations such as constituent adding or surface coating. In particular, the additional operations associated with the surface coating involve very intricate processing conditions.

In addition, among five phases of YO-WO based phosphors, $Y_2W_3O_{12}$ phosphors used with a Eu active element serve properly as red phosphors. However, $Y_2W_3O_{12}$ phosphors used with low-voltage, and high current density electron emissions serve as CL phosphors with reduced performance by approximately 60% compared to $Y_2O_3$:Eu phosphors.

SUMMARY OF THE INVENTION

An aspect of the present invention provides an yttrium based phosphor having an enhanced luminance characteristic under low voltage, and high current density conditions.

Another aspect of the present invention provides a process for preparing the yttrium based phosphor.

Another aspect of the present invention provides a display device including the yttrium based phosphor.

According to another aspect of the present invention, there is provided a $Y_2O_3$:Eu based red phosphor including a conducting material.

In another aspect of the present invention, the conducting material is at least one selected from the group consisting of $SnO_2$, $WO_3$ and $In_2O_3$.

According to another aspect of the present invention, the conducting material is preferably $WO_3$.

According to another aspect of the present invention, the conducting material may be contained in an amount of 0.1 to 5 mol by percent based on 1 mol of $Y_2O_3$ as a host.

In another aspect of the present invention, the conducting material may form a mixed phase with $Y_2O_3$ as a host.

According to another aspect of the present invention, the mixed phase is preferably $Y_2O_3$—$WO_3$.

According to another aspect of the present invention, there is provided a process for preparing a $Y_2O_3$:Eu based red phosphor including obtaining a blend solution by co-precipitating Eu as an activator in a solvent containing $Y_2O_3$ as a host, adding a conducting material to the blend solution and stirring the resultant mixture, baking the mixture, and pulverizing and filtering the baked mixture to yield the $Y_2O_3$:Eu based red phosphor containing the conducting material in a mixed phase In another aspect of the present invention, the conducting material is at least one selected from the group consisting of $SnO_2$, $WO_3$ and $In_2O_3$.

According to another aspect of the present invention, the heating may be performed at a temperature in a range of approximately 1500 to approximately 1600° C. for 1 to 5 hours.

According to still another aspect of the present invention, there is provided a display device including the $Y_2O_3$:Eu based red phosphor including the conducting material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
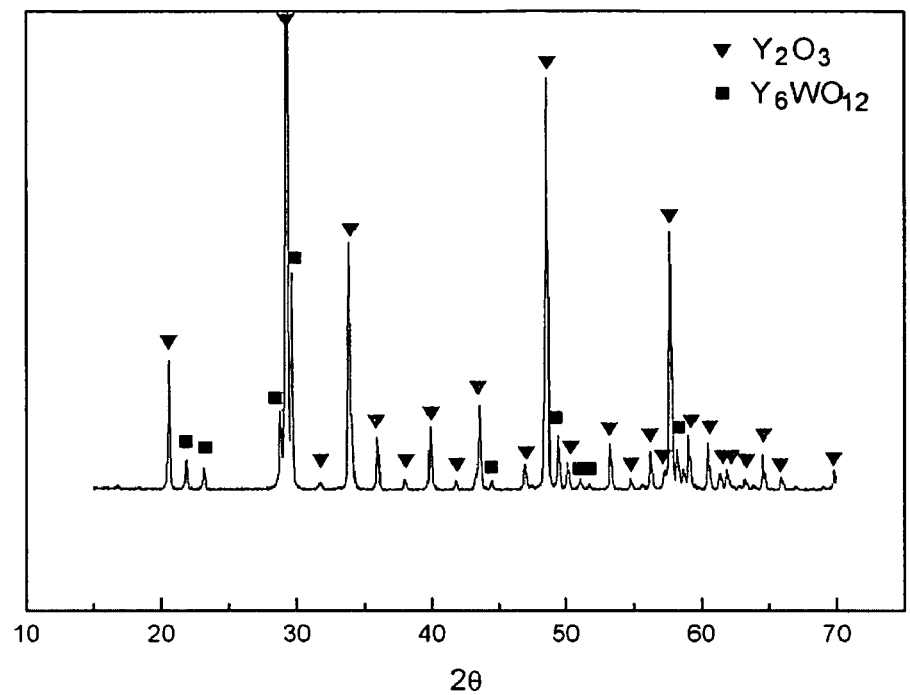
FIG. 1 illustrates phase analysis results observed from a yttrium based red phosphor containing a conducting material ($WO_3$) of Example 1 and a pure yttrium ($Y_2O_3$:Eu) based red phosphor.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An aspect of the present invention is generally directed to a red phosphor including a conducting material, the red phosphor having an yttrium oxide phosphor as a host activated by a Europium activator. The conducting material forms a mixed phase in association with the phosphor host to exhibit conductivity (n type). Unlike the conventional conductive phosphors, the present conducting material requires no intricate operations associated with adding or coating, particularly surface coating.

The red phosphor according to an aspect of the present invention is obtained by adding a conducting material to a $Y_2O_3$:Eu phosphor as a host and heating the same to form a mixed phase in association with the host. The conducting material is a semi-conducting material exhibiting conductivity (n type), which is attributable to extra electrons present in the host. Usable examples of the conducting material include at least one selected from the group consisting of $WO_3$, $SnO_2$ and $In_2O_3$. Particularly, $WO_3$ is more preferred.

For example, when $WO_3$ is used as the conducting material, it combines with the host material, i.e., $Y_2O_3$ through a heating process to form a $Y_2O_3$—$WO_3$ mixed phase. There are a variety of mixed phases known. Reportedly, a fluorite-type, which is one of representative mixed phases, $Y_6WO_{12}$:Eu phosphor exhibits red luminescence and has very low quantum efficiency of 15% (Hans J. Borchardt, Inorganic Chemistry, Vol. 2, p. 170 (1963)), thereby imparting additional luminescence to the $Y_2O_3$:Eu phosphor as a host, and ultimately enhancing the luminance performance. When electron beams are irradiated under low voltage, and high current density conditions, the effect of enhancing the luminance characteristic is particularly exerted.

The conducting material forming a mixed phase with $Y_2O_3$ as the red phosphor host is contained in an amount of 0.1 to 5 mol by percent based on 1 mol of $Y_2O_3$. If the amount of the conducting material is less than 0.1 mol, the desired effect of imparting the conductivity to the red phosphor host is negligible. If the amount of the conducting material is greater than 5 mol, the relative amount of the host is reduced and the luminance characteristic of the phosphor undesirably deteriorates. A preferred amount of the conducting material is in a range 1 to 5 mol by percent based on 1 mol of $Y_2O_3$ as a host.

The red phosphor including the conducting material according to an aspect of the present invention can be prepared by the following method.

The $Y_2O_3$:Eu red phosphor including the conducting material according to an aspect of the present invention is prepared by co-precipitating Eu as an activator in a solvent containing $Y_2O_3$ as a host to obtain a blend solution, adding a conducting material to the blend solution and stirring the resultant blend solution, baking the blend solution, and pulverizing and filtering the baked mixture to yield the $Y_2O_3$:Eu based red phosphor containing the conducting material in a mixed phase.

As to the solvent, there are no particular restrictions on any solvent generally used in the phosphor preparation process, and the solvent is preferably used in a sufficiently large amount enough to stir the solvent with the phosphor host.

The mixed phase of the phosphor host and the conducting material is formed in the course of the heating process in the preparation method. The heating process is preferably performed in an air atmosphere or in an inert gas, e.g., nitrogen, atmosphere. The heating process may be a baking process.

When the heating process is a baking process, the baking process is preferably performed at a temperature in a range of approximately 1500 to about 1600° C. If the baking temperature is lower than 1500° C., the baking performance is poor, a mixed phase created between the conducting material and the phosphor host is incomplete. If the baking temperature is greater than 1600° C., the excess gives rise to deterioration in emission efficiency of the baked phosphor due to growth of nanoparticles.

In the baking process, the baking is preferably performed for 1 to 5 hours. When the baking time is shorter than 1 hour, the baking performance is poor. If the baking time is longer than 5 hours, the excess baking brings about no proportionate improvement, proving uneconomical.

The phosphor host used in the preparation method is $Y_2O_3$, which may be either a generally used phosphor or a phosphor prepared by co-precipitating Eu as an activator in the conventional phosphor. Eu as the activator may be used in a generally acceptable amount, for example, approximately 5.7 mol by percent relative to 1 mol of the phosphor host.

As described above, as to the conducting material forming a mixed phase in association with the phosphor host, there are no particular restrictions on any n-type semi-conducting material that can be imparted conductivity from extra electrons present in the host. Usable examples of the conducting material include at least one selected from the group consisting of $WO_3$, $SnO_2$ and $In_2O_3$. Particularly, $WO_3$ is preferred. When $WO_3$ is used as the conducting material, it combines with the host material, i.e., $Y_2O_3$ through a heating process to form a $Y_2O_3$—$WO_3$ mixed phase.

In the preparation method, a contained amount of the conducting material forming the mixed phase with $Y_2O_3$ as the red phosphor host ranges from 0.1 to 5 mol based on 1 mol of $Y_2O_3$. If the amount of the conducting material contained is less than 0.1 mol, the desired effect of imparting the conductivity to the red phosphor host is negligible. If the amount of the conducting material is greater than 5 mol by percent, the relative amount of the host is reduced and the luminance characteristic of the phosphor undesirably deteriorates. A preferred amount of the conducting material is in a range 1 to 5 mol by percent based on 1 mol of $Y_2O_3$ as a host.

Various operations subsequent to the baking are substantially the same as or similar to those of general phosphor preparation methods, and the inventive phosphors can be attained by practicing conventional techniques without particular restrictions, for example, pulverizing and/or filtering.

The thus-prepared red phosphor including the conducting material, according to an aspect of the present invention, provides enhanced quantum efficiency due to an internally formed mixed phase, which imparts additional luminescence to the phosphor, thereby enhancing luminance characteristic under low-voltage, and high current density conditions, compared to a pure $Y_2O_3$:Eu host which does not use a conducting material.

Due to such improved luminance, the red phosphors according to an aspect of the present invention are useful in a wide variety of display applications, for example, a plasma display panel (PDP), a field emission display (FED), a vacuum fluorescent display (VFD), a cathode ray tube (CRT), or the like. In particular, the red phosphors according to an aspect of the present invention can be advantageously used in display devices such as CRTs.

In the following descriptions, specific details are set forth such as Examples and Comparative Examples to provide a thorough understanding of the present invention. However, it will be obvious to those skilled in the art that various modifications and changes can be made within the scope of present invention.

EXAMPLE 1

As a base phosphor, a red phosphor was prepared by co-precipitating 5.7 wt % of Eu element in a $Y_2O_3$ (commercially available from AMR) as a host, and an additive $WO_3$ was added in an amount of 1 mol % based on 1 mol of the $Y_2O_3$ host to obtain a blend. Next, the resultant blend was well stirred to then be subjected to a thermal treatment performed in an inert atmosphere at a baking temperature of approximately 1550° C. for about 3 hours. After the thermal treatment, the baked blend was pulverized and filtered. Finally, the target product, that is, the $Y_2O_3$:Eu red phosphor having a $Y_2O_3$—$WO_3$ mixed phase is obtained.

EXAMPLE 2

A $Y_2O_3$:Eu red phosphor having a $Y_2O_3$—$WO_3$ mixed phase was prepared by the same method as in Example 1 except that an amount of $WO_3$ used was 0.1 mol % instead of 1 mol %.

EXAMPLE 3

A $Y_2O_3$:Eu red phosphor having a $Y_2O_3$—$WO_3$ mixed phase was prepared by the same method as in Example 1 except that an amount of $WO_3$ used was 0.5 mol % instead of 1 mol %.

EXAMPLE 4

A $Y_2O_3$:Eu red phosphor having a $Y_2O_3$—$WO_3$ mixed phase was prepared by the same method as in Example 1 except that an amount of $WO_3$ used was 5 mol % instead of 1 mol %.

EXPERIMENTAL EXAMPLE 1

Phase Analysis Test

FIG. 1 illustrates results of phase analysis performed on the red phosphor of Example 1, the red phosphor containing the conducting material ($WO_3$) having a YO-WO mixed phase obtained through the thermal treatment, and a pure yttrium ($Y_2O_3$:Eu) based red phosphor.

Referring to FIG. 1, it was confirmed that adding of 1 mol % $WO_3$ proved a YO-WO mixed phase, as reported by Hans J. Borchardt in Inorganic Chemistry.

EXPERIMENTAL EXAMPLE 2

Luminescence Evaluation Test

Figure 2:
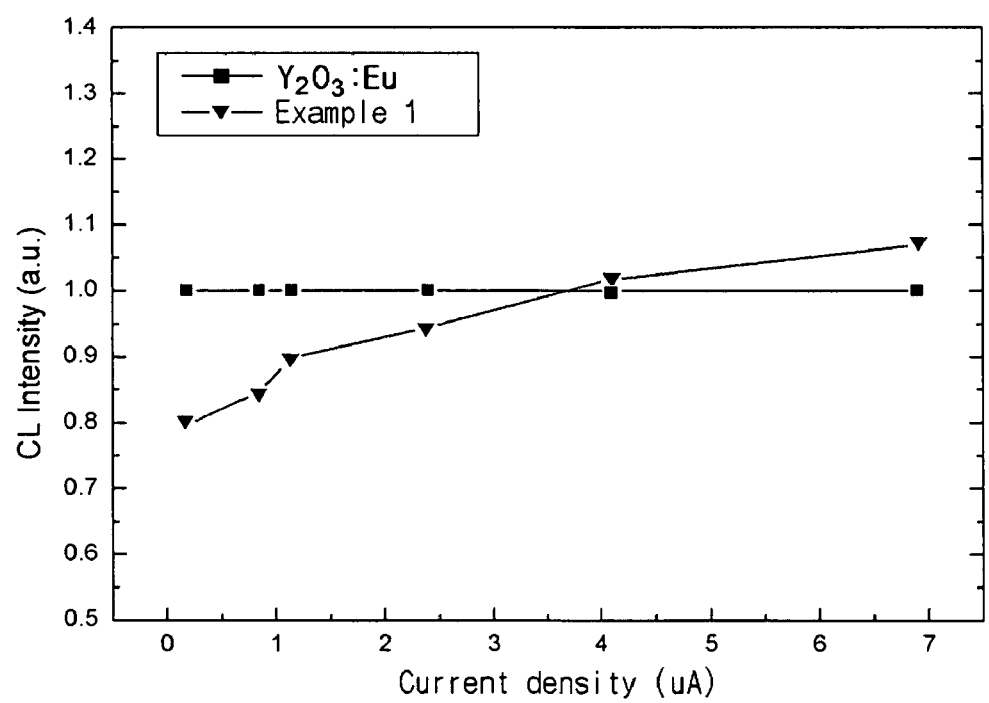
FIG. 2 illustrates the current density dependency of luminance characteristics of the yttrium based red phosphor including the conducting material ($WO_3$) of Example 1 and a pure yttrium ($Y_2O_3$:Eu) based red phosphor.

FIG. 2 illustrates the current density dependency of luminance characteristics of the yttrium based red phosphor including the conducting material ($WO_3$) of Example 1 and a pure yttrium ($Y_2O_3$:Eu) based red phosphor. Here, the phase analysis results are indicated by cathodoluminescent (CL) intensity-versus-current density relationships.

Referring to FIG. 2, when compared to the pure $Y_2O_3$:Eu phosphor without a mixed phase, the inventive red phosphor exhibited an enhanced luminance characteristic by approximately 5% at a high current density of 3.5 µA or higher.

As described above, the red phosphor including the conducting material according to an aspect of the present invention provides enhanced quantum efficiency due to an internally formed mixed phase, which imparts additional luminescence to the phosphor, and thereby ultimately an enhanced luminance characteristic under low-voltage, and high current density conditions, compared to the case of using the pure $Y_2O_3$:Eu host without using a conducting material.

The red phosphors having the improved luminance are useful in a wide variety of display applications, for example, a plasma display panel (PDP), a field emission display (FED), a vacuum fluorescent display (VFD), a cathode ray tube (CRT), or the like. In particular, the red phosphors according to an aspect of the present invention can be advantageously used in display devices such as CRTs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A $Y_2O_3$:Eu based red phosphor comprising a conducting material, wherein the conducting material is selected from the group consisting of $SnO_2$, $WO_3$, and $In_2O_3$, and wherein the conducting material forms a mixed phase with $Y_2O_3$ as a host.

2. The $Y_2O_3$:Eu based red phosphor of claim 1, wherein the conducting material is contained in an amount of 0.1 to 5 mol by percent based on 1 mol of $Y_2O_3$ as a host.

3. The $Y_2O_3$:Eu based red phosphor of claim 1, wherein the mixed phase is $Y_2O_3$—$WO_3$.

4. The Y2O3:Eu based red phosphor of claim 1, wherein the conducting material is a semi-conducting material exhibiting n-type conductivity.

5. A display device comprising a $Y_2O_3$:Eu based red phosphor having a conducting material, wherein the conducting material is selected from the group consisting of $SnO_2$, $WO_3$, and $In_2O_3$ and the conducting material forms a mixed phase with $Y_2O_3$ as a host.

6. The display device of claim 5, wherein the conducting material is contained in an amount of 0.1 to 5 mol by percent based on 1 mol of $Y_2O_3$ as a host.

7. The display device of claim 5, wherein the mixed phase is $Y_2O_3$—$WO_3$.

8. A red phosphor comprising:
    a host consisting of an yttrium oxide phosphor;
    an activator consisting of europium; and
    a conducting material selected from the group consisting of $SnO_2$, $WO_3$, and $In_2O_3$, wherein the conducting material forms a mixed phase in association with the host.

9. The red phosphor of claim 8, wherein the europium is contained in an amount of 5.7 mol by percent relative to 1 mol of the phosphor.

10. The red phosphor of claim 8, wherein the conducting material is contained in an amount of 0.1 to 5 mol by percent based on 1 mol of $Y_2O_3$ as a host.

11. A process for preparing a $Y_2O_3$:Eu based red phosphor comprising:
    co-precipitating Eu as an activator in a solvent containing $Y_2O_3$ as a host to obtain a blend solution;
    adding a conducting material to the blend solution and stirring the mixture to obtain a resultant blend solution;
    baking the resultant blend solution to obtain a baked mixture; and
    pulverizing and filtering the baked mixture to yield the $Y_2O_3$:Eu based red phosphor containing the conducting material in a mixed phase wherein the conducting material is selected from the group consisting of $SnO_2$, $WO_3$, and $In_2O_3$ and the conducting material forms a mixed phase with the $Y_2O_3$ as a host.

12. The process of claim 11, wherein the baking of the resultant blend solution is performed at a temperature in a range of approximately 1500 to approximately 1600° C. for 1 to 5 hours.

* * * * *